(12) United States Patent
Algüera

(10) Patent No.: US 7,717,451 B2
(45) Date of Patent: May 18, 2010

(54) SLIDING DEVICE FOR A FIFTH WHEEL COUPLING

(75) Inventor: José Manuel Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 290 days.

(21) Appl. No.: 11/660,075

(22) PCT Filed: Sep. 3, 2005

(86) PCT No.: PCT/EP2005/009482

§ 371 (c)(1),
(2), (4) Date: Feb. 12, 2007

(87) PCT Pub. No.: WO2006/029731

PCT Pub. Date: Mar. 23, 2006

(65) Prior Publication Data

US 2008/0029995 A1  Feb. 7, 2008

(30) Foreign Application Priority Data

Sep. 18, 2004  (DE)  ........................ 10 2004 045 663

(51) Int. Cl.
*B62D 53/06* (2006.01)
(52) U.S. Cl. ..................................... 280/438.1; 280/407
(58) Field of Classification Search ................. 280/407, 280/407.1, 438.1
See application file for complete search history.

(56) References Cited

U.S. PATENT DOCUMENTS

| 2,978,688 | A | * | 4/1961 | Rumble | ................... | 340/870.2 |
| 3,030,125 | A | * | 4/1962 | Braunberger | ............... | 280/407 |
| 4,429,892 | A | * | 2/1984 | Frampton et al. | ........... | 280/407 |
| 4,614,355 | A | | 9/1986 | Koch | | |
| 5,314,201 | A | | 5/1994 | Wessels | | |
| 5,617,072 | A | | 4/1997 | McNeal | | |
| 5,863,057 | A | * | 1/1999 | Wessels | ................... | 280/149.2 |
| 5,915,713 | A | * | 6/1999 | Kniep | ........................ | 280/441 |
| 6,203,045 | B1 | | 3/2001 | Kyrtsos et al. | | |
| 6,302,424 | B1 | * | 10/2001 | Gisinger et al. | ............. | 280/433 |
| 6,736,420 | B2 | * | 5/2004 | Laarman et al. | .......... | 280/438.1 |
| 6,866,283 | B2 | * | 3/2005 | Alguera et al. | .............. | 280/432 |
| 7,140,632 | B2 | * | 11/2006 | Alguera et al. | .............. | 280/433 |
| 7,411,511 | B2 | * | 8/2008 | Kennish et al. | .......... | 340/573.1 |
| 2003/0001361 | A1 | | 1/2003 | Laarman et al. | | |
| 2003/0047907 | A1 | | 3/2003 | Hicks et al. | | |
| 2008/0036173 | A1 | * | 2/2008 | Alguera | ...................... | 280/407 |

FOREIGN PATENT DOCUMENTS

| DE | 17 80 488 | 1/1972 |
| DE | 42 32 256 | 4/1993 |

(Continued)

*Primary Examiner*—Tony H. Winner
(74) *Attorney, Agent, or Firm*—Hudak, Shunk & Farine Co. LPA

(57) ABSTRACT

A sliding device for a fifth wheel coupling, which includes two guide rails mounted on a vehicle in the longitudinal direction thereof and a slide which can be displaced on the guide rails. A locking device mounted on the slide can be brought into an open position and a locked position by an actuator. In order to improve handling of the sliding device, at least one locking sensor for detecting the locked position is provided. The locking sensor is connected to a display device and/or to the vehicle electronics.

22 Claims, 8 Drawing Sheets

FOREIGN PATENT DOCUMENTS

| | | |
|---|---|---|
| DE | 44 02 529 | 8/1994 |
| DE | 195 27 334 | 2/1996 |
| DE | 196 06 374 | 8/1997 |
| DE | 197 45 733 | 4/1999 |
| DE | 199 44 684 | 11/2000 |
| DE | 101 61 619 | 6/2002 |
| DE | 102 06 474 | 8/2003 |
| EP | 0 503 954 | 9/1992 |
| EP | 1 006 338 | 6/2000 |
| EP | 0 822 130 | 6/2001 |
| FR | 2 801 270 | 5/2001 |
| JP | 2002331971 | 11/2002 |
| WO | 2004/022415 | 3/2004 |

* cited by examiner

SLIDING DEVICE FOR A FIFTH WHEEL COUPLING

FIELD OF THE INVENTION

The invention relates to a sliding device for a fifth wheel coupling, particularly for a semitrailer aggregate, said sliding device having guide rails which are oriented in the longitudinal direction of the tractor, and further having a slide which is slidable on said guide rails, which slide bears a locking device which can be brought into an open (unlocked) position and a locked position by means of an actuating device.

BACKGROUND OF THE INVENTION

A sliding device is a device which bears the fifth wheel coupling and allows the coupling to be adjusted in the longitudinal direction of the vehicle and in particular to be moved into various positions.

After adjusting the sliding device, particularly during a trip, it might occur that the driver will forget to lock the sliding device mechanism so as to hold the fifth wheel coupling in a given position. This may lead to uncontrolled shifting during travel, and to hazardous situations. E.g., when traveling on a steep downhill grade or when undergoing braking, the front of the semi-trailer may strike the cab of the tractor.

Additionally, with known sliding devices, problems may occur relating to distribution of the load to various axles, and relating to the overall length of the tractor-semitrailer combination. Improper load distribution may affect driving characteristics, may cause excess tire wear, and may lead to undesirable loading of axles whereby allowed limits are exceeded. The length of the tractor-semitrailer aggregate may come to exceed legal limits. If the tractor-semitrailer aggregate is too short, the front of the semi-trailer may collide with the tractor cab or chassis, on turns. A further drawback of known sliding devices is that substantial driver time and effort are consumed in adjusting the length of the tractor-semitrailer aggregate, with the driver having to alight from and reenter the cab multiple times to check the changed length. This adversely affects the economic advantages of employing a sliding device in the first place.

Sliding devices are known, e.g. from DE AS 1780488, EP 0503954 A1, and DE 19944684 C1.

Further, U.S. Pat. No. 6,736,420 B2 discloses a sliding device wherein a sliding device which bears the fifth wheel coupling is slidably mounted on two guide rails equipped with toothed beams. The slide bears a locking device comprising locking pieces which engage the toothed beams.

One of the locking pieces is connected to an opening lever, and the other locking piece is connected to a locking piece lever member, wherewith the opening lever and locking piece lever member are themselves interconnected. The opening lever is connected to an actuating device, which may be, e.g., a pulling-handle bar for manual actuation or an actuator driven by a pressure medium. In the open condition, the two lever elements assume a bent (unaligned) position, and in the locked condition the two lever elements assume a straightened (aligned) position. With this known sliding device it is necessary for the driver to visually monitor the position of the slide before he begins driving.

SUMMARY OF THE INVENTION

The underlying problem of the present invention was to devise means of avoiding or minimizing the problems of safety and economic efficiency which are attendant upon known sliding devices, which problems are associated with locking and adjusting the sliding device.

This problem is solved with a sliding device which is characterized by at least one locking sensor for detection of the locked position, which locking sensor is connected to a display device and/or to the electronic system of the vehicle.

The means and conditions of introduction of the locking sensor (locations etc.) depend on the configuration of the sliding device itself, and possibly on the type of drive means employed for the slide.

For example, the sliding device may have a drive motor with at least one drive shaft, wherewith the locking device may be in the form of means for stopping the rotation of the drive shaft after the locking position has been reached. With this arrangement, the locking sensor is preferably disposed on or at the drive shaft, or at a suitable location on the guide rail(s) or slide.

Alternatively, the slide may be moved by manual means, or may be movable by operation (movement) of the tractor while the semi-trailer is coupled to the tractor. With such an arrangement, the locking device may comprise means of locking the slide to the guide rails, wherewith the locking sensor may be disposed on the guide rail(s) or slide, preferably on the slide (so as to facilitate detection of the locking condition regardless of the position of the slide along the guide rails).

The display device connected to the locking sensor serves to inform the driver whether the locking device is in the proposed locking condition or not. The display device may be an acoustic or optical indicator device, preferably disposed in the tractor cab.

The display device may be permanently active, whereby it constantly indicates the condition of the locking device (locked or open). The device may also be coupled to the ignition system of the vehicle, wherewith when the ignition is turned on the current condition of the locking device is displayed. In this connection, it is recommended that additional monitoring means be provided which check the functionality of the sensor(s).

If the locking sensor is connected to the electronic system of the vehicle, the linkage may be configured such that it is not possible to advance the vehicle or release the brakes if the locking device is not in the locked position. If, e.g. during travel, the locking condition is interfered with, means may be provided in the electronic system of the vehicle whereby a safe braking process is initiated.

The display device and/or monitoring device may be connected to (or integrated into) control means whereby the locking device of the sliding device can be actuated, and/or the locking device of the fifth wheel coupling can be actuated. The task of the driver is made easier if means of remote control of the fifth wheel coupling and/or the sliding device are provided, in combination with the at least one locking sensor of the locking device, because all functions can then be performed from the tractor cab, and the driver need not alight from the cab to ensure that the proper locking condition has been achieved.

According to a preferred embodiment, the locking sensor is mounted on or in a sliding device accompanying guide rails which have toothed beams, and the locking device is comprised of at least two locking pieces which engage the two toothed beams. A first locking piece is articulatedly connected to an opening lever connected to the actuating device, and a second locking piece is articulatedly connected to a locking piece lever member, wherewith both lever elements are articulatedly interconnected so that, in the open position of the locking device, the two lever elements assume a "first terminal bent position", and, in the locked position of the locking device, the two lever elements assume a "second terminal bent position". In this preferred embodiment, the locking sensor is disposed so as to detect the "second terminal bent position".

It is advantageous if, in the "second terminal bent position", the lever elements abut against an abutment plate; and if the locking sensor is disposed on the abutment plate. Preferably, the locking sensor is disposed on the reverse side of the abutment plate. The locking sensor may advantageously be an inductive sensor.

A spring element may be provided which engages one of the two lever elements, to urge the lever elements against the abutment plate when they are in the "second terminal bent position". The locking device may considered to be locked when the locking pieces engage the toothed beam. Kinematically, the locked condition is achieved when the two lever elements are urged against the abutment plate by means of the said spring element. The position of the abutment plate is chosen such that the common articulation point of the two lever elements is beyond the extended (straight) configuration when the locked condition is achieved. In this "second terminal bent position", preferably said lever elements are disposed mutually at an obtuse angle. If the locking pieces are unintentionally released (e.g. dislodged) from their locking positions, the consequence will be increased forcing of the two lever elements against the abutment plate. It will be possible to move the lever elements back from the "second terminal bent position" into the extended (straight) configuration and beyond, if and only if the locking device is moved by operation of the actuating device. Thus, effective means have been provided for preventing the locking pieces from being moved out of their locking positions. The locking device thus remains locked, and this condition is reported by the locking sensor.

To open the locking device, preferably the opening lever is moved open (to the open position), by means of a pneumatic cylinder or manually.

Preferably, the actuating device can be brought into a secured position and an unsecured position, wherewith when the actuating device is in the secured position the locking device can be secured in its locked position; and a securing sensor is provided, for detection of the secured position, wherewith said sensor is connected to a display device and/or to the electronic system of the vehicle. The location of the securing sensor is chosen based on the particular configuration of the actuating mechanism.

According to a preferred embodiment, the actuating device is comprised of a pulling-handle bar which has a first catch means which, when the locking device is in its locked position, engages a second catch means associated with the slide; and the securing sensor is disposed such that it detects the engaged position (engaged condition) of the catch means.

According to a preferred embodiment, the first catch means comprises a catch notch, and the second catch means comprises a guide element having a slot through which the pulling-handle bar is extended.

Accordingly, the securing sensor is preferably disposed near the pulling-handle bar, namely near the first catch means. The securing sensor provides information to the driver (e.g. via a display device) concerning whether the entire mechanism comprised of the locking pieces and lever elements is in the locked state. When such an indication is provided it signifies that the mechanism has been securely locked, in that the engagement of the catch means may be regarded as a second mechanical securing means. In order to disengage the locking pieces, the catch means must first be disengaged and the pulling-handle bar must be moved into its open position. This is essentially the only way for the locking device to be moved out of its locked position.

According to another embodiment, the actuating device may have a remotely operable drive means; wherewith the securing sensor may be disposed on or at said drive means. The drive means may comprise an actuator (motor or cylinder or the like) driven by a pressure medium, which actuator is articulatedly connected to the opening lever.

One can further improve the safety and security of the sliding device by providing a load sensor for detecting the vertical load on the fifth wheel coupling, wherewith said load sensor may be connected to a display device and/or to the electronic system of the vehicle. Preferably, the load sensor is disposed on the slide, below the attaching means of the fifth wheel coupling. The sensor may comprise a pressure transducer or weighing cell, which may be disposed, e.g., in the region of the bearing shells which are disposed between the bearing supports and the fifth wheel coupling plate.

The load sensor(s) will determine the load on the coupling plate. When the fifth wheel coupling is stationary, the distribution of the load between the front axle and rear axle depends on the geometric positioning of the fifth wheel coupling between said axles. By use of the sliding device, it is possible to adjust this distribution as a function of the particular loading of the semi-trailer; this has the advantage of enabling one to avoid an improper or legally impermissible axle loading. An improper loading may detract from optimum driving behavior, and may cause excessive tire wear.

If the position of the fifth wheel coupling is known (e.g. based on the position of the slide along the guide rails), the axle loadings can be calculated. Accordingly, it is advantageous if at least one position sensor is provided, which sensor (s) may be connected to a display device and/or to the electronic system of the vehicle.

There are a number of possibilities for the particular embodiment of the position sensor(s). Preferably the position sensor is a distance sensor, comprising a sending unit and a receiving unit, disposed on the slide and the guide rail, respectively.

If (non-manual) drive means are provided for moving the slide, which drive means comprise at least one drive shaft, the position sensor may comprise an angular excursion measuring device.

Advantageously, the drive means for the sliding device may comprise an electronically regulated motor unit. Preferably, the motor unit has means for moving the slide depending on the vertical load on the fifth wheel coupling as determined by the load sensor. Preferably the adjusted (new) position of the fifth wheel coupling, and the overall length of the tractor-semitrailer combination, are arrived at depending on the vertical load on the fifth wheel coupling.

The various sensors employed may comprise, e.g., inductive sensors, magnetic sensors, force sensors, pressure sensors, or reed sensors.

BRIEF DESCRIPTION OF THE DRAWINGS

Exemplary embodiments of the invention will be described in more detail hereinbelow, with reference to the drawings.

FIG. 8b is an enlarged view of detail Z of FIG. 8a.

DETAILED DESCRIPTION OF THE INVENTION

Figure 1:
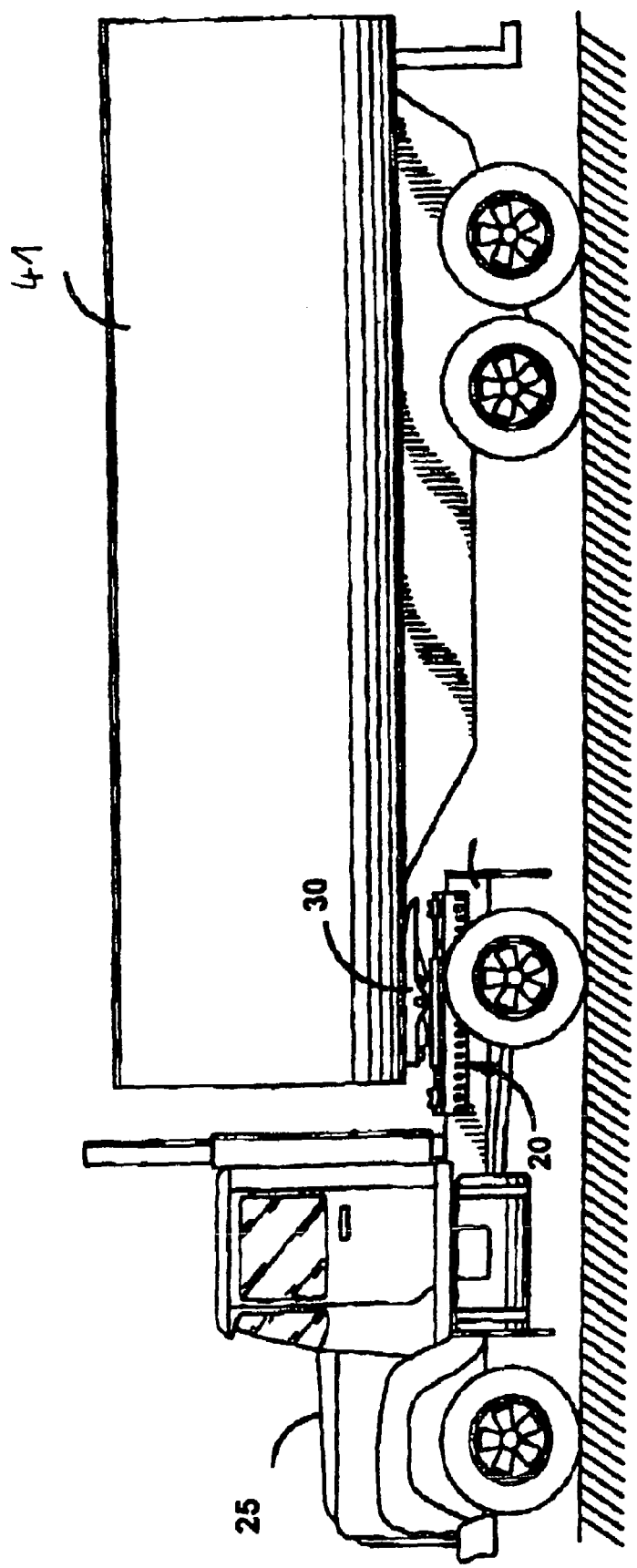
FIG. 1 is a schematic representation of a semi-trailer aggregate having a fifth wheel coupling and a sliding device.

FIG. 1 shows schematically a semi-trailer aggregate (double train) (40) with tractor (25) and semi-trailer (41). The aggregate (40) has a fifth wheel coupling (30) and a sliding device (20). The sliding device (20) enables sliding the coupling (30) in the longitudinal direction of the tractor (25).

Figure 2:
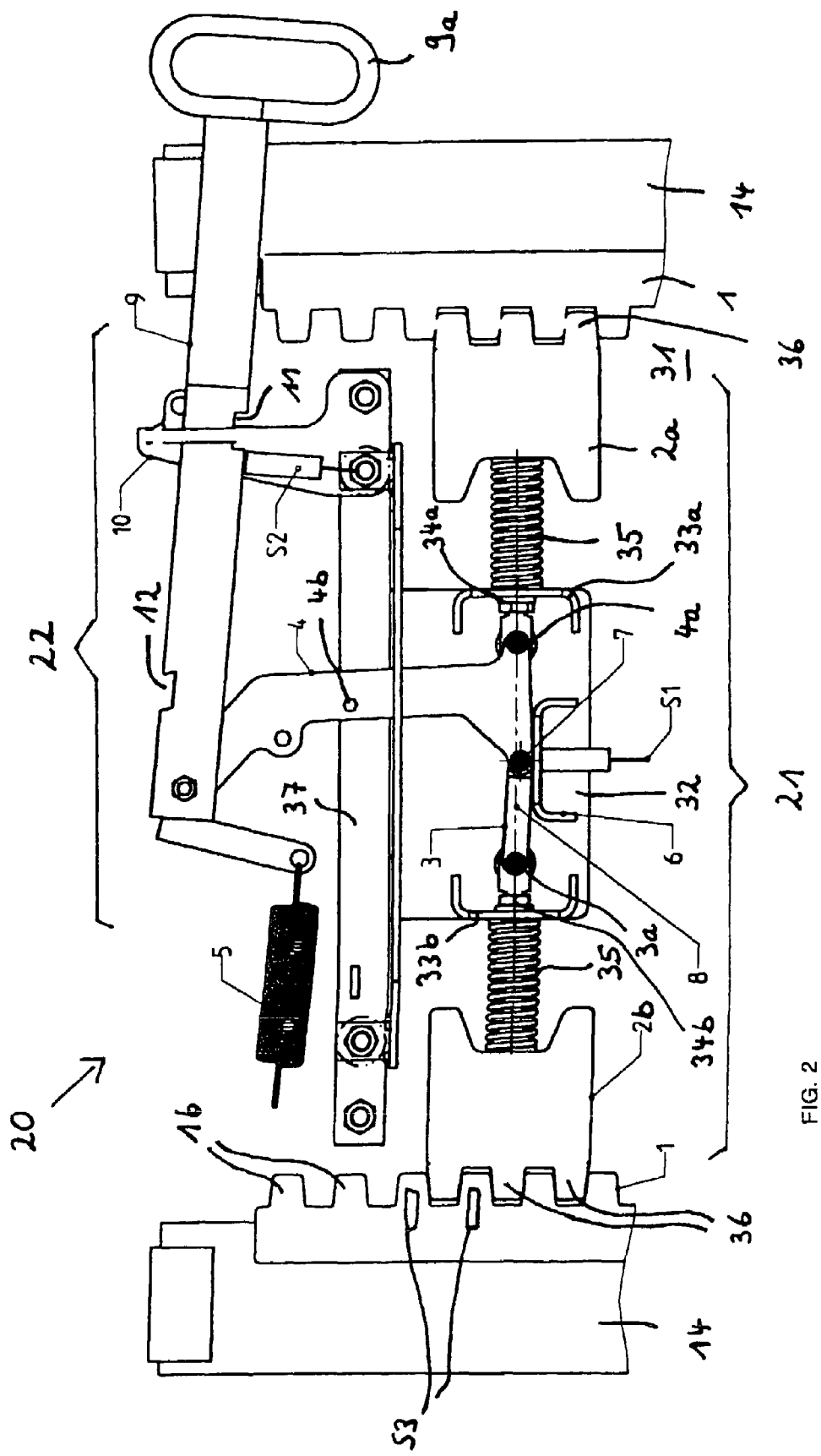
FIG. 2 is a plan view of a portion of the inventive sliding device wherein the locking device is in the locked position.
Figure 5:
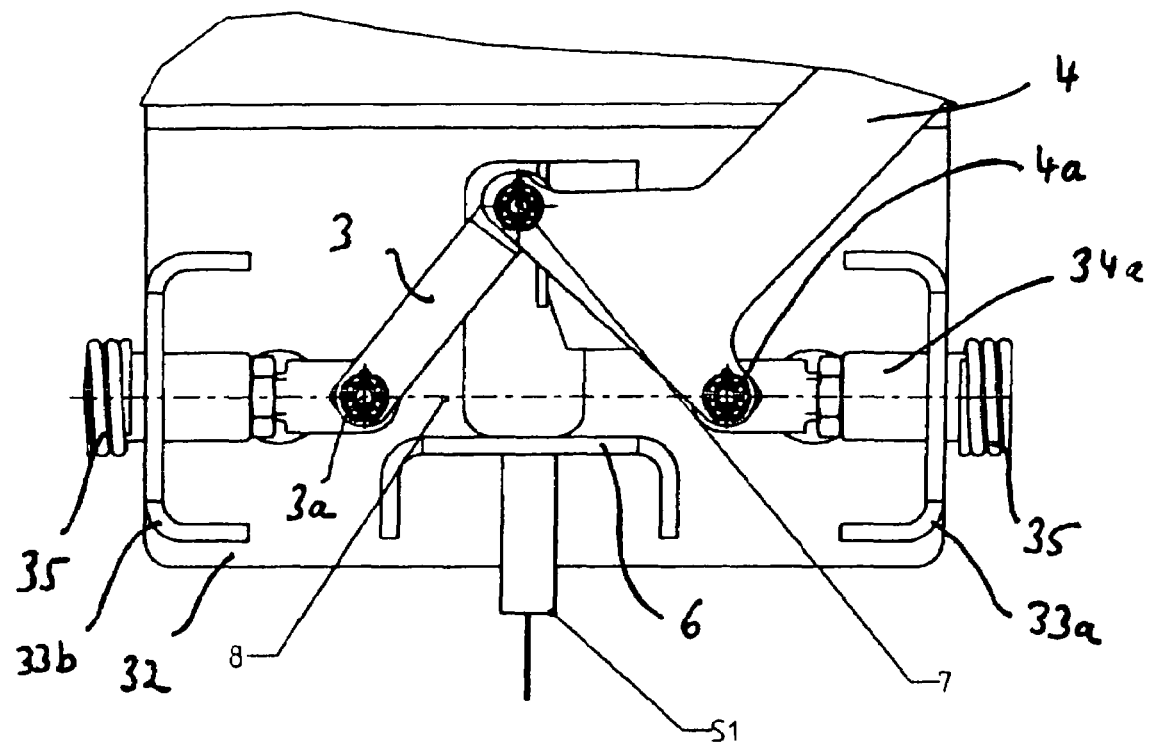
FIG. 5 is a detail of a portion of FIG. 4.

FIGS. 2 and 5 are plan views of a portion of an inventive sliding device (20), having a locking device (21). The locking device (21) can be set in an open position and a locked position, according to the invention. The locked position (closed position) of the locking device (21) is shown in FIGS. 2 and 5.

Attached to the tractor (25) are parallel guide rails (14, 14) with toothed beams (1) having teeth (16). The teeth are directed inwardly and are disposed in a common plane.

A slide (31) is slidably disposed on the guide rails (14, 14). The frame of the slide (31) is not shown in FIG. 2. A base plate (32) is fixed to the slide (31), and the locking device (21) is disposed on said base plate (32). Two guide elements (33a, 33b) for the locking pieces (2a, 2b) are attached to the base plate (32); the guide pins (34a, 34b) of said guide elements are slidably arranged in the guide elements (33a, 33b). The locking pieces (2a, 2b) have locking teeth 36 which engage between the teeth (16) of the toothed beam (1) when the locking device (21) is in the locked position illustrated in FIG. 2. Compression springs (35, 35) are disposed on the guide pins (34a, 34b) and are supported against the guide elements (33a, 33b); these springs urge the locking pieces (2a, 2b) into their locking positions.

An essentially T-shaped opening lever (4) is connected to the guide pin (34a) at an articulation point 4a; and locking piece lever (3) is connected to pin (34b) at the articulation point (3a). The two lever elements (3, 4) are articulatedly interconnected, with a common articulation point (7).

The opening lever (4) is swingably mounted on a traverse (37) of the slide (31), at an articulation point (4b).

On the free end of the opening lever (4), the lever (4) is engaged by the actuating device (22) which is comprised of a pulling-handle bar (9) with a handle (9a) and a tensile spring (5), which spring urges the opening lever into the "second terminal bent position" illustrated in FIG. 2.

Figure 4:
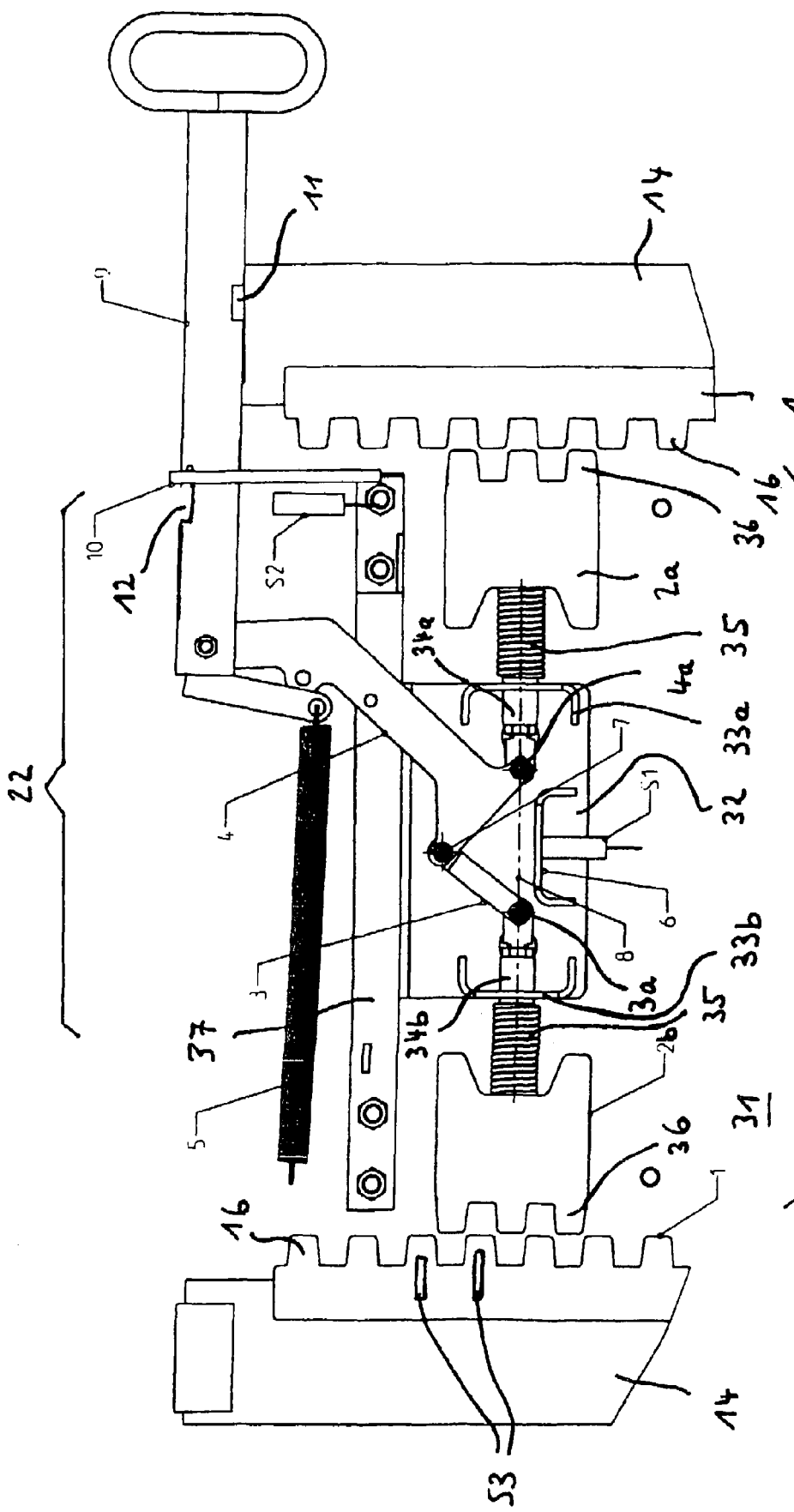
FIG. 4 is a plan view of a portion of the inventive sliding device wherein the locking device is in the open position.

When tensile force is applied to the handle (9a) against the force of spring (5), the opening lever (4) is swung so that the locking pieces (2a, 2b) are withdrawn from their locking positions and into their open positions, as illustrated in FIG. 4 ("first terminal bent position" of the levers (3, 4)).

In FIG. 2, the articulation point (7) lies outside the line (8) between the two articulation points (3a, 4a), so that both lever elements (3, 4) assume the "second terminal bent position". With reference to the articulation points (3a, 7, 4a), the lever elements (3, 4) form an obtuse angle, wherewith the lever elements (3, 4) abut against an abutment surface (6) in the region of the common articulation point (7). This "second terminal bent position" has the advantage that in the locked position the locking pieces cannot be dislodged from their locking positions, in that an effort to do so will only increase the force of the articulation point (7) against the abutment plate (6). A locking sensor (S1) is disposed behind the abutment plate (6); this sensor (S1) is connected to a display device (not shown) in the cab of the tractor (25).

The opening-handle bar (9) is inserted through a slot in a guide piece (10) which piece is attached to the traverse (37). The opening-handle bar (9) has two catch notches (11, 12), on opposite sides. In the locked position shown in FIG. 2, the edge of the slot in guide piece (10) engages the notch (11), so as to securely hold the pulling-handle bar (9) in place. This securing configuration is detected by a securing sensor (S2) which is disposed next to the guide piece (10) in a manner enabling it to sense the presence of the pulling-handle bar (9) in the engaged state. The securing sensor (S2) is connected to a display device disposed in the tractor cab.

Figure 3:
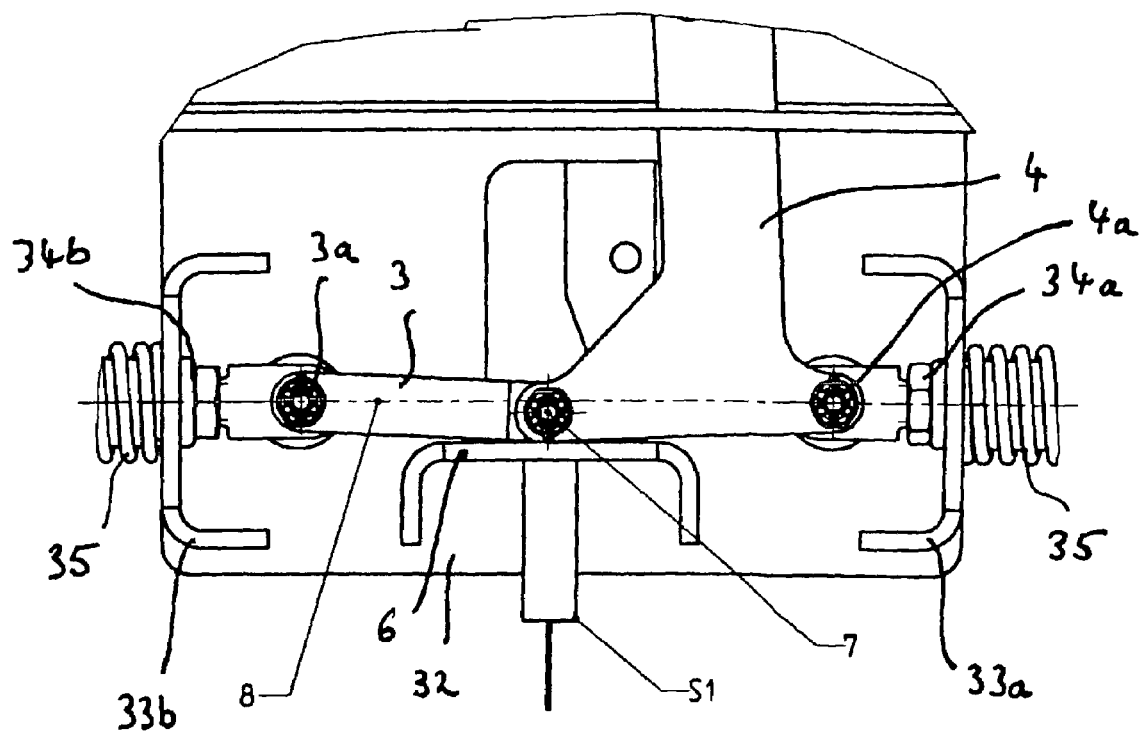
FIG. 3 is detail view of a portion of FIG. 2.

In FIG. 3, an enlarged view of the locking device (21) in the neighborhood of the abutment plate (6) is shown. It is seen clearly that the two lever elements (3, 4) form a triangle with their articulation points (3a, 4a, 7) which triangle has an obtuse angle, with the common articulation point (7) being outside the line 8 joining the articulation points (3a, 4a).

The open position of the locking device (21) is shown in FIGS. 4 and 5. To open the device (21), the pulling-handle bar (9) has been released from its secured position and pulled in the direction of the arrow. This causes the tensile spring (5) connected to the opening (4) to be placed under tension, as the opening lever (4) is swung around the articulation point (4a). As a result of the T-shape of the opening lever (4), the common articulation point (7) is moved away from the "second terminal bent position" in which the articulation point (7) is pressed against the abutment plate (6) and is swung to the other side of the line (8), so that the two lever elements (3, 4) are moved into their "first terminal bent position", regarding their articulation points (31, 4a, 7), as shown in FIG. 4. This movement of the opening lever (4) causes the guide pins (34a, 34b) to move mutually closer together, wherewith the two locking pieces (2a, 3a) are moved out of their locking positions. The second catch notch (12) of the pulling-handle bar (9) prevents the locking device (21) from being re-closed, because the pulling-handle bar (9) is secured in the guide piece (10) via said notch (12) and is urged against the edge of the slot in piece (10), despite the fact that the locking tensile spring (5) urges bar (9) back toward the locked position. Accordingly, the second catch notch (12) is referred to as the "hitching notch".

Meanwhile, the compression springs (35, 35) undergo compression. In the open position, the slide (31) is freely movable, wherewith it, together with the fifth wheel coupling (30) which it bears, can be slid in the longitudinal direction of the vehicle. When the desired new position is reached, the pulling-handle bar (9) is released at its "hitching notch" (12) and is pushed inward, wherewith the locking pieces (2a, 3a) are moved back into their locking positions, under the urging of the springs (5; 35, 35).

FIGS. 2 and 4 also show, in addition to the features described supra, at least one position sensor (S3) for the aforementioned sliding device (20), for the purpose of detecting the current position of setting of the fifth wheel coupling (30) from among the numerous possible such positions. Advantageously, the initial position may be displayed to the driver, e.g. in the tractor cab, either automatically or upon the driver's query. This is particularly useful if a specific length of the tractor-trailer combination is sought. The position sensors (S3) may be disposed, e.g., in the region of the toothed beam (1); they may be in the form of, e.g., magnetic sensors, pressure sensors, force sensors, or the like.

Figures 6A, 6B:
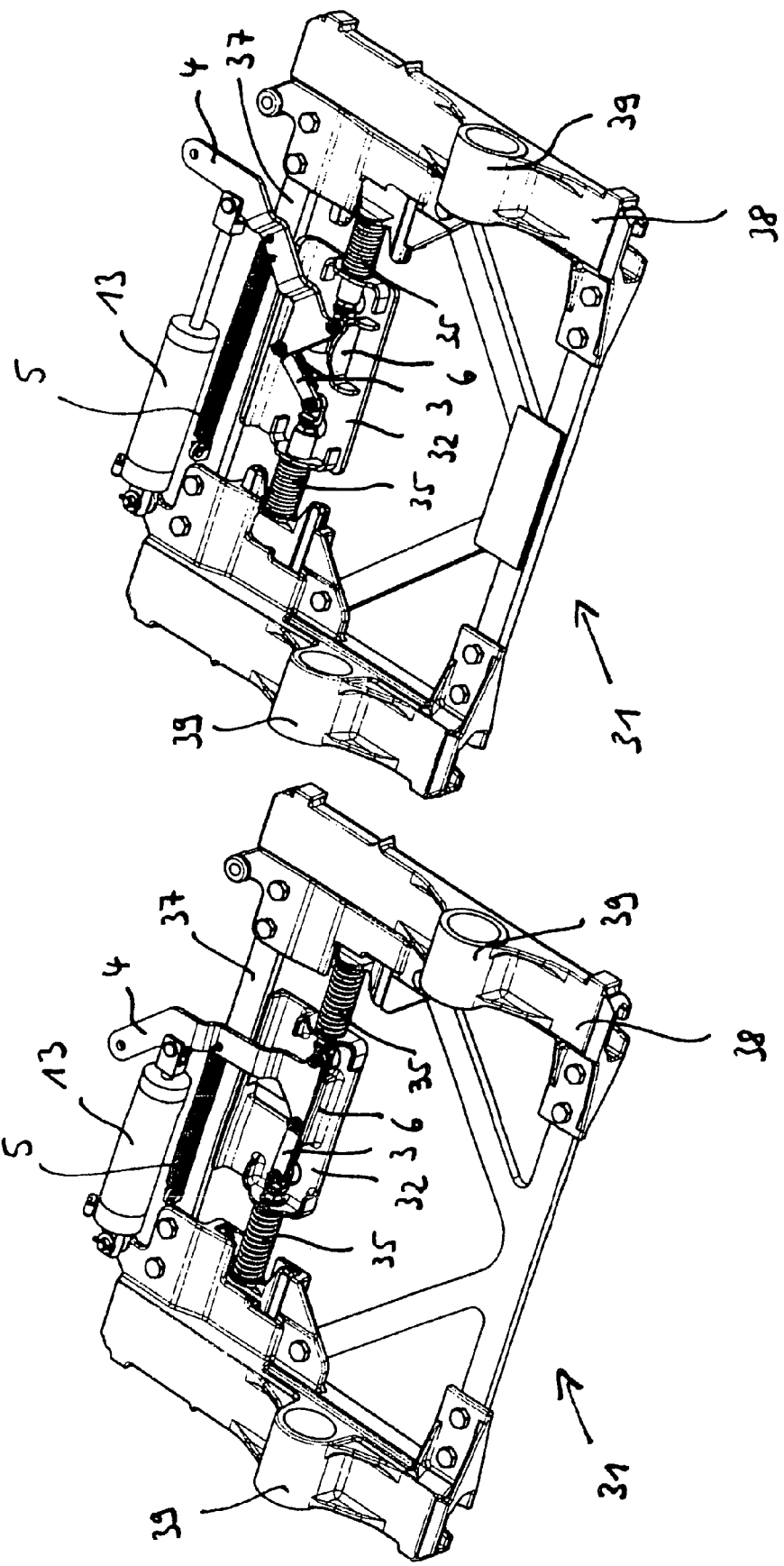
FIGS. 6a and 6b illustrate a sliding device having a pneumatic actuating means.

FIGS. 6a and 6b are perspective views of the slide (31), FIG. 6a showing the locked condition and FIG. 6b the open (unlocked) condition. Bearing supports (39) for accommodating the fifth wheel coupling (coupling not shown) are provided on the frame (38) of the slide (31). In this embodiment, the actuating device does not have a manual handle but rather a cylinder (13) operated by a pressure medium, which cylinder (13) is attached on one side to the opening lever (4) and on the other side to the frame (38) of the slide (31). The cylinder (13) is preferably a pneumatic cylinder which facilitates remote actuation of the locking device (21).

In the region of the bearing structure (not shown) on both sides of the bearing supports (39) in FIGS. 6a and 6b, load sensors (S4, S4) are provided which are connected to display devices in the tractor cab.

Such a load sensor (S4) (or a group of such sensors) may be in the form of a pressure transducer or weighing cell. Thereby according to the invention it is possible to determine the load borne by the coupling plate. If a position sensor (S3) is present, it is possible to determine the axle loads on specific axles for a given axle configuration, based on the signals from the position sensor (S3) and load sensor(s) (S4). If such information is available to the driver, e.g. in the tractor cab, the driver can make decisions about the optimum safety and economic efficiency of operation of the tractor-trailer aggregate.

Figure 7:
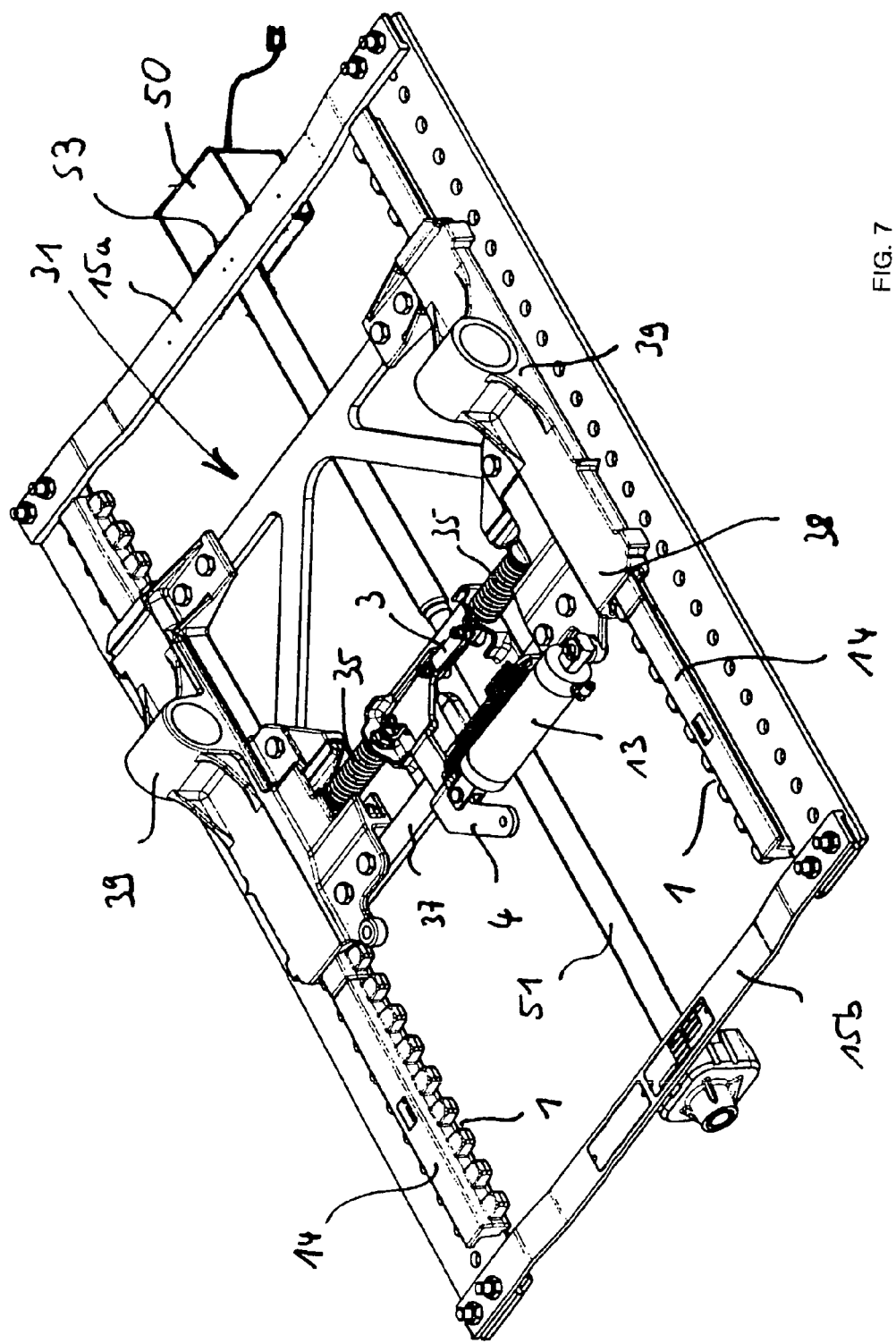
FIG. 7 illustrates a sliding device driven by a rotating shaft means.

The drive means for the slide (31) illustrated in FIG. 7 comprises an electric motor (50) mounted on the crossmember (15a), which motor (50) drives a drive shaft (51) which engages the slide (31). The shaft (51) is mounted on a, second crossmember, (15b). The position sensor (S3) is in the form of a rotational excursion sensor, which is disposed on or in the electric motor (50).

Figure 8A:
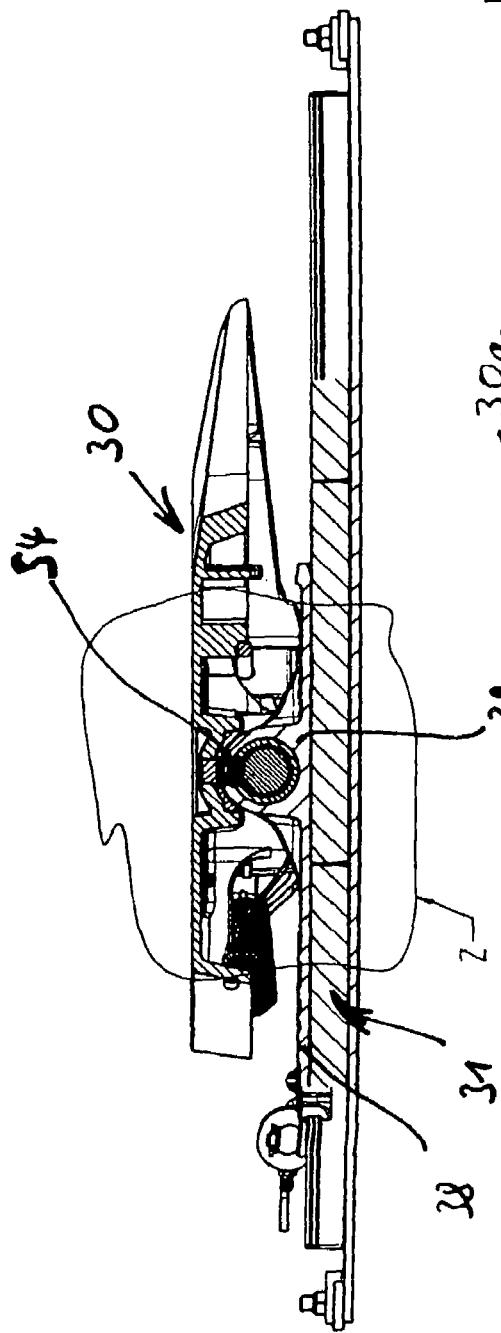
FIG. 8a is a vertical cross section through a sliding device with a fifth wheel coupling and a load sensor.
Figure 8B:
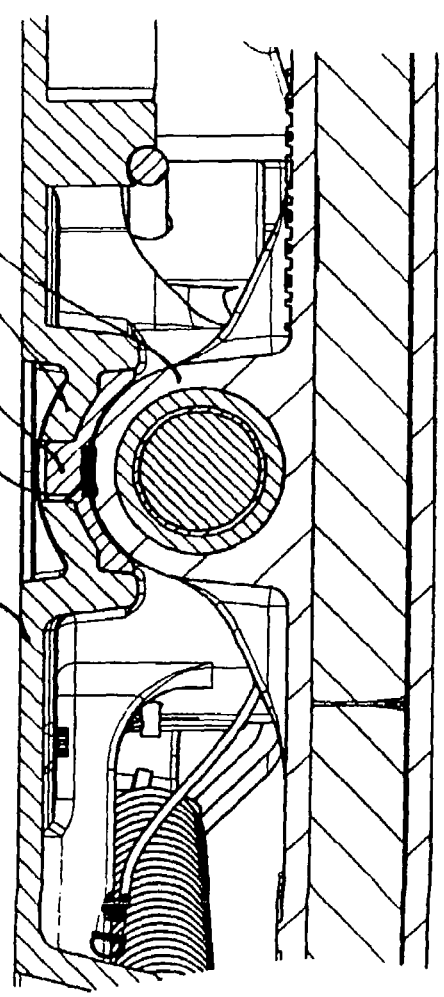

FIGS. 8a and 8b illustrate the bearing structure of the fifth wheel coupling (30), which is positioned on the slide (31) of the sliding device (20). The fifth wheel coupling (30) is swingably mounted on the two bearing supports (39); a bearing shell (52) is disposed between each bearing support (39) and the bearing part (30a) of the fifth wheel coupling. The load sensor (S4) is disposed either inside the bearing shell (52) or between the bearing shell (52) and the bearing support (39).

LIST OF REFERENCE NUMERALS 1 toothed beam.
2a, 2b locking piece
3 locking piece lever
3a articulation point
4 opening lever
4a, 4b articulation point
5 tensile spring
6 abutment plate
7 common articulation point
8 line joining two points (two articulation points)
9 pulling-handle bar
9a handle
10 guide piece
11 catch notch
12 catch notch
13 cylinder for pressure medium
14 guide rail
15a, 15b crossmember
16 tooth
20 sliding device
21 locking device
22 actuating device
25 tractor of semi-trailer aggregate
30 fifth wheel coupling
30a bearing part of fifth wheel coupling
31 slide (carriage)
32 base plate
33a, 33b guide element
34a, 34b guide pin
35 compression spring
36 locking tooth
37 traverse
38 frame
39 bearing support
40 semi-trailer aggregate (tractor-trailer combination)
41 semi-trailer
50 drive means (electric motor)
51 drive shaft
52 bearing shell
S1 locking sensor
S2 securing sensor
S3 position sensor
S4 load sensor

What is claimed is:

1. A sliding device for a fifth wheel coupling, comprising two guide rails disposed on a vehicle adapted to be connected to a semi-trailer vehicle, wherein the rails are oriented in a longitudinal direction of the vehicle, and further having a slide which is slidable on said guide rails, wherein the slide includes a locking device which can be brought into an open (unlocked) position and a locked position by an actuating device; wherein at least one locking sensor for detection of the locked position is provided, wherein the locking sensor is connected to a) a display device or to b) an electronic system of the vehicle or c) both the display device and electronic system of the vehicle, wherein the guide rails have toothed beams, wherein the locking device has at least two locking pieces which engage the two toothed beams, wherein a first locking piece is articulately connected to an opening lever connected to the actuating device, and a second locking piece is connected to a locking piece lever member, wherein the two lever elements are swingably interconnected in such a manner that, when the locking device is in its open position, the two levers assume a "first terminal bent position", wherein the two levers assume a "second terminal bent position" when the locking device is in its locked position; and wherein the locking sensor is disposed such that the locking sensor detects said "second terminal bent position".

2. The sliding device according to claim 1, wherein the at least one locking sensor is in the form of an inductive sensor a magnetic sensor, a force sensor a pressure sensor or a reed sensor.

3. The sliding device according to claim 1, wherein in the "second terminal bent position" the lever elements abut against an abutment plate; and the locking sensor is disposed on the abutment plate.

4. The sliding device according to claim 3, wherein the locking sensor is disposed on a reverse side of the abutment plate.

5. The sliding device according to claim 1, wherein a spring element engages one of the two lever elements, and wherein the spring element urges the lever elements into the "second terminal bent position" against an abutment plate.

6. The sliding device according to claim 1, wherein in the "second terminal bent position" the lever elements mutually form an obtuse angle.

7. The sliding device according to claim 1, wherein the actuating device is bringable into a secured position and an unsecured position, wherein in the secured position the locking device can be secured in its locked position, and wherein a securing sensor is provided for detection of the secured position and said securing sensor is connected to a) a display device or b) to an electronic system of the vehicle or c) both the display device and the electronic system of the vehicle.

8. The sliding device according to claim 7, wherein the actuating device has a pulling-handle bar which has a first catch means which, when the locking device is in its locked position, engages a second catch means associated with the slide; and wherein the securing sensor is disposed such that the securing sensor detects the engaged position (engaged condition) of the catch means.

9. The sliding device according to claim 8, wherein the first catch means comprises a catch notch, and the second catch means comprises a guide element having a slot through which the pulling-handle bar is extended.

10. The sliding device according to claim 1, wherein the actuating device has a remotely operable drive means; and wherein a securing sensor is disposed on or at said drive means.

11. The sliding device according to claim 10, wherein the drive means comprises at least one actuator driven by a pressure medium, wherein the actuator acts on the opening lever.

12. The sliding device according to claim 1, wherein at least one load sensor for detecting a vertical load on the fifth wheel coupling, and the load sensor is connected to a) a display device or b) to an electronic system of the vehicle or c) both the display device and the electronic system of the vehicle.

13. The sliding device according to claim 12, wherein the load sensor is disposed on the slide, below an attaching means of the fifth wheel coupling.

14. The sliding device according to claim 1, wherein at least one position sensor for detecting a position of the slide relative to the guide rails, and the position sensor is connected to a) a display device or b) to an electronic system of the vehicle or c) both the display device and the electronic system of the vehicle.

15. The sliding device according to claim 14, wherein the position sensor is a distance sensor or an excursion sensor.

16. The sliding device according to claim 14, wherein a drive means for moving the slide on the guide rails is provided.

17. The sliding device according to claim 16, wherein the drive means has at least one drive shaft, and the position sensor is a rotational excursion measuring device.

18. The sliding device according to claim 16, wherein the drive means comprises an electronically regulated motor unit.

19. The sliding device according to claim 18, wherein the motor unit has means for moving the slide depending on the vertical load on the fifth wheel coupling as determined by a load sensor.

20. A sliding device for a fifth wheel coupling, comprising two guide rails disposed on a vehicle adapted to be connected to a semi-trailer vehicle, wherein the rails are oriented in a longitudinal direction of the vehicle, and further having a slide which is slidable on said guide rails, wherein the slide includes a locking device which can be brought into an open (unlocked) position and a locked position by an actuating device; wherein at least one locking sensor for detection of the locked position is provided, wherein the locking sensor is connected to a) a display device or b) to an electronic system of the vehicle or c) both the display device and electronic system of the vehicle, wherein the actuating device is bringable into a secured position and an unsecured position, wherein in the secured position, the locking device can be secured in its locked position, wherein a securing sensor is provided for detection of the secured position of the actuating device, and wherein said securing sensor is connected to a) a display device or b) to an electronic system of the vehicle or c) both the display device and the electronic system of the vehicle.

21. The sliding device according to claim 20, wherein the actuating device has a pulling-handle bar which has a first catch means which, when the locking device is in its locked position, engages a second catch means associated with the slide; and wherein the securing sensor is disposed such that the securing sensor detects the engaged position (engaged condition) of the catch means.

22. The sliding device according to claim 21, wherein the first catch means comprises a catch notch, and the second catch means comprises a guide element having a slot through which the pulling-handle bar is extended.

* * * * *